(12) United States Patent
Kurakake et al.

(10) Patent No.: US 6,625,498 B1
(45) Date of Patent: Sep. 23, 2003

(54) NUMERICAL CONTROL SYSTEM

(75) Inventors: Mitsuo Kurakake, Tokyo (JP); Kentaro Fujibayashi, Tokyo (JP); Seiji Akashi, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/568,588

(22) Filed: May 11, 2000

(30) Foreign Application Priority Data

May 11, 1999 (JP) .............................. 11-129923

(51) Int. Cl.[7] .............................................. G05B 19/18
(52) U.S. Cl. ................................. 700/3; 700/2; 700/19; 700/20; 700/56; 700/58; 709/400; 713/400; 713/502
(58) Field of Search ........................... 700/2, 3, 19, 20, 700/56–66; 709/400; 713/400, 502

(56) References Cited

U.S. PATENT DOCUMENTS

| 4,805,085 A | | 2/1989 | Mogi et al. |
| 5,050,146 A | | 9/1991 | Richgels et al. |
| 5,361,260 A | * | 11/1994 | Mito .............................. 318/41 |
| 5,391,970 A | | 2/1995 | Chaffee et al. |
| 5,532,932 A | * | 7/1996 | Niwa ........................... 700/188 |
| 5,850,338 A | * | 12/1998 | Fujishima ..................... 700/3 |
| 6,049,358 A | * | 4/2000 | Jun .............................. 327/31 |

FOREIGN PATENT DOCUMENTS

| EP | 0 507 955 A1 | 10/1992 | ........... G05B/19/18 |
| EP | 0 600 263 A2 | 6/1994 | ........... G05B/19/04 |
| EP | 0 735 444 A2 | 10/1996 | ........... G05B/19/18 |
| JP | 3-273303 | 12/1991 | |
| JP | 8-123520 | 5/1996 | |
| JP | 09 146623 A | 6/1997 | ......... G05B/19/414 |

* cited by examiner

*Primary Examiner*—Ramesh Patel
*Assistant Examiner*—Thomas Pham
(74) *Attorney, Agent, or Firm*—Staas & Halsey LLP

(57) ABSTRACT

In a master unit, clock signals from a clock are counted by a counter, and clock data is generated. This clock data is outputted to a slave unit by a driver, and stored in clock data storage memory. The slave unit stores clock data received by a receiver in the clock data storage memory. A processor for a program controller of the master and slave units starts up, and executes the synchronized operation of an operating program of axes that are synchronized on the basis of clock data stored in the clock data storage memory. It is also possible to commence operation of an axis under other conditions without relying on clock data. If override is applied to clock data, override will apply only to an axis that is synchronized and operated in accordance with clock data.

20 Claims, 11 Drawing Sheets

| MASTER AXIS LOCATION | MOTOR #1 LOCATION | MOTOR #2 LOCATION | . . . . . . . . . | MOTOR #n LOCATION |
|---|---|---|---|---|
| 1 | 3 | 4 | . . . . . . . . . | 10 |
| 2 | 5 | 3 | . . . . . . . . . | 8 |
| 3 | 6 | 2 | . . . . . . . . . | 10 |
| 4 | 7 | 1 | . . . . . . . . . | 12 |
| . | . | . | . . . . . . . . . | . |
| 10 | 15 | 6 | . . . . . . . . . | 20 |
| . | . | . | . . . . . . . . . | . |

NUMERICAL CONTROL SYSTEM

BACKGROUND OF THE INVENTION

1. Field of the Invention

The present invention relates to a numerical control system, which, by interconnecting a plurality of numerical control devices (CNC devices), increases the number of axes controlled, and synchronizes these plurality of CNC devices. Such a numerical control system is used especially with machines for which multiple axis synchronization is required, such as a rotary press, packaging machine, painting machine, and the like.

2. Description of the Related Art

To execute control using a plurality of CNC devices, the respective axes of these CNC devices are synchronized. As a method for synchronizing these axes, there is a known method, in which motion command data is transmitted from a CNC device, which constitutes a master unit, to each axis of other CNC devices, which constitute slave units, performing synchronized control (refer to Japanese Patent Application Laid-open (JP-A) Nos. 9-204215, 10-13394, and 9-146623).

Further, there is also a known method, in which positioning data of an axis, which constitutes a reference, like a so-called electronic cam, is transmitted to each CNC device, and based on the position of this reference axis, the positions of the axes, which are controlled by each CNC device respectively, are controlled (refer to JP-A No. 7-302 103).

There are the following two modes for transmitting this reference axis positioning data to each CNC device.

1. External Pulse Synchronization Mode

In this mode, as shown in FIG. 18, a master axis 80, which constitutes a reference (for example, a camshaft) is provided externally, and a pulse indicating the position of this master axis 80 is generated by a pulse generator 81. Then, this pulse is inputted to each CNC device #1–#n, which are slave units. By so doing, each CNC device #1–#n performs positioning control by computing the positioning location (motor-driven axis location) of the axes (slave axes) they each control from the inputted position of this master axis 80. That is, the respective axes (slave axes) of CNC devices #1–#n are controlled in synchronization with master axis 80.

To control the positioning location of a slave axis relative to this master axis 80, coefficient N/M is set as a parameter for each slave axis. Then, CNC devices #1–#n, which control each slave axis, carry out positioning control such that a slave axis assumes an N/M position relative to the position of master axis 80. This method is used in a case in which a slave axis is connected to master axis 80 by a train of gearings.

Further, there is also employed a method, in which the position X of master axis 80 is treated as an argument, and the position Y of a slave axis is determined by function f(X). In this method, for a master axis position X, which is inputted to CNC devices #1–#n, which are slave units, slave axis position Y=f(X) is determined by function f(X) of each slave axis, which is set in these CNC devices #1–#n, respectively, and each slave axis is positioning controlled to this position.

Furthermore, as another method for determining the position of a slave axis using either the above-mentioned coefficient or function, there is a method in which a slave axis position is determined by patterning. In this method, as shown in FIG. 20, there is prepared a data table, which stores the corresponding position of each slave axis to the position of a master axis. Then, CNC devices #1–#n, which constitute slaves, are controlled such that the position of each slave axis relative to the position of the master axis is positioned in a position set and stored in this data table.

2. Internal Pulse Synchronization Mode

In this mode, as shown in FIG. 19, a CNC device #1 is designated a master unit without providing a master axis externally, and the remaining CNC devices #2–#n are designated slave units. Then, the master unit #1 controls the axis thereof (virtual master axis), and causes pulse generating means 82 to generate a reference pulse (indicating the position of the virtual master axis), and outputs this pulse to each slave unit (CNC device) #2–#n.

By so doing, each slave unit #2–#n performs positioning control by computing from an inputted virtual master axis position the positioning location of the axis (slave axis) which the slave unit itself controls.

Further, a slave axis is also disposed in the master unit, and this slave axis, too, is control by axis controlling means 83 based on virtual master axis position data.

Furthermore, in the internal pulse synchronization mode, the position of a slave axis relative to a master axis is determined by either a coefficient (N/M), function Y=f(X), or a data table like that shown in FIG. 20, as in the case of the external pulse synchronization mode which were explained above.

In the above-mentioned prior art, for the external pulse synchronization mode, an actual operating part, such as a camshaft, is required on the outside. Providing an actual operating camshaft or the like is disadvantageous from the standpoints of costs and maintenance.

By contrast thereto, the internal pulse synchronization mode is advantageous to the extent that there is no need to provide an external camshaft or the like. However, there is a disadvantage in that, since the position of a virtual master axis must be controlled by the master unit, the number of master unit-controlled axes is reduced by 1 because complex control is required. That is, in master axis positioning control, in addition to simple movement, stopping, and override, there is a need for complex control, such as acceleration/deceleration control, and anticipatory control performed on the basis of future positioning data. Therefore, the master axis must be used as a master unit control axis, resulting in actual control axes being reduced by 1.

Furthermore, in the above-mentioned prior art, since slave axes are positioned dependent upon a master axis position transmitted from a master unit, it is not possible to control either a specified slave axis, or a certain slave axis relative to other slave axes, independent of the position of the master axis. That is, it is not possible to control a certain slave axis (not the master axis) in synchronization with other slave axis. For example, it is not possible to operate different numerical control device in a manner such that the axes of different numerical control devices (slave units) operates in synchronization with one another in a certain section, but operate without synchronization in another section. Further, it is also not possible to forcibly change the programmed speed of only a certain slave axis by applying override, independent of the master axis or another slave axis.

OBJECTS AND SUMMARY OF THE INVENTION

An object of the present invention is to provide a numerical control system capable of freely synchronizing or desynchronizing a slave axis with respect to a master axis.

The numerical control system according to the present invention comprises; one numerical control device constituting a master unit and one or more numerical control devices constituting slave units, in which the axes controlled by these different numerical control devices are controlled in synchronism with each other.

The numerical control device constituting a master unit comprises; clock data generating means for generating clock data by either counting up or counting down at a prescribed time interval; transmitting means for transmitting the clock data generated by the clock data generating means to the slave unit from the master unit; storing means for storing a program including motion commands of an axis controlled by this master unit; and means for starting up the program based on the clock data.

And each of the numerical control devices constituting slave units comprises; storing means for storing a program including motion commands of an axis controlled by each slave unit; and means for starting a program based on clock data from the master unit.

A numerical control system according to the present invention can adopt the following embodiments.

The master unit and slave units further may comprise startup time storing means for storing startup time data for starting a program; and starting means for starting a program at a startup time stored in this startup time storing means.

The numerical control device may comprise means for controlling a count operation of clock data generating means by a signal from either outside or inside.

Means for controlling a count operation may comprise at least one or more of the functions of count reset and count start, count pause and restart, and a count override function.

A signal from either outside or inside may be generated from the master unit and/or a slave unit.

The master unit and slave units may comprise means for adjusting clock data for delays accompanying the transmitting of clock data.

Slave units may comprise means for adjusting clock data for delays accompanying clock data transmission and discrepancy of operational reference unit time.

The numerical control system may comprise means for starting a program including motion commands for each axis, without depending on clock data, and operates in a certain section axes of different numerical control devices, with synchronization, and operates in another section those axes without synchronization.

The master unit may be equipped with a plurality of means for generating clock data to transmit a plurality of clock data so that slave units can receive a plurality of clock data, with the result that which of the plurality of clock data a program should be based on can be selected for each axis of slave units, allowing control of the axes with synchronization by dividing them into groups.

The numerical control system may comprise a plurality of master units instead of one master unit so that clock data is generated individually by each master unit, and a plurality of clock data is transmitted, and slave units can receive the plurality of clock data, with the result that which of the plurality of clock data a program should be based on can be selected for each axis of slave units, allowing control of the axes with synchronization by dividing them into groups.

In the present invention, there is no need to reduce the number of control axes of the CNC device serving as the master unit. Further, it is easy to change the combination of axes to be synchronized, and to create an section that is synchronized, and a section that is not synchronized. Furthermore, the present invention is advantageous in that, by overriding clock data, it is possible to override all synchronized axes while not overriding axes not syncronized, thereby controlling increase of cycle time.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
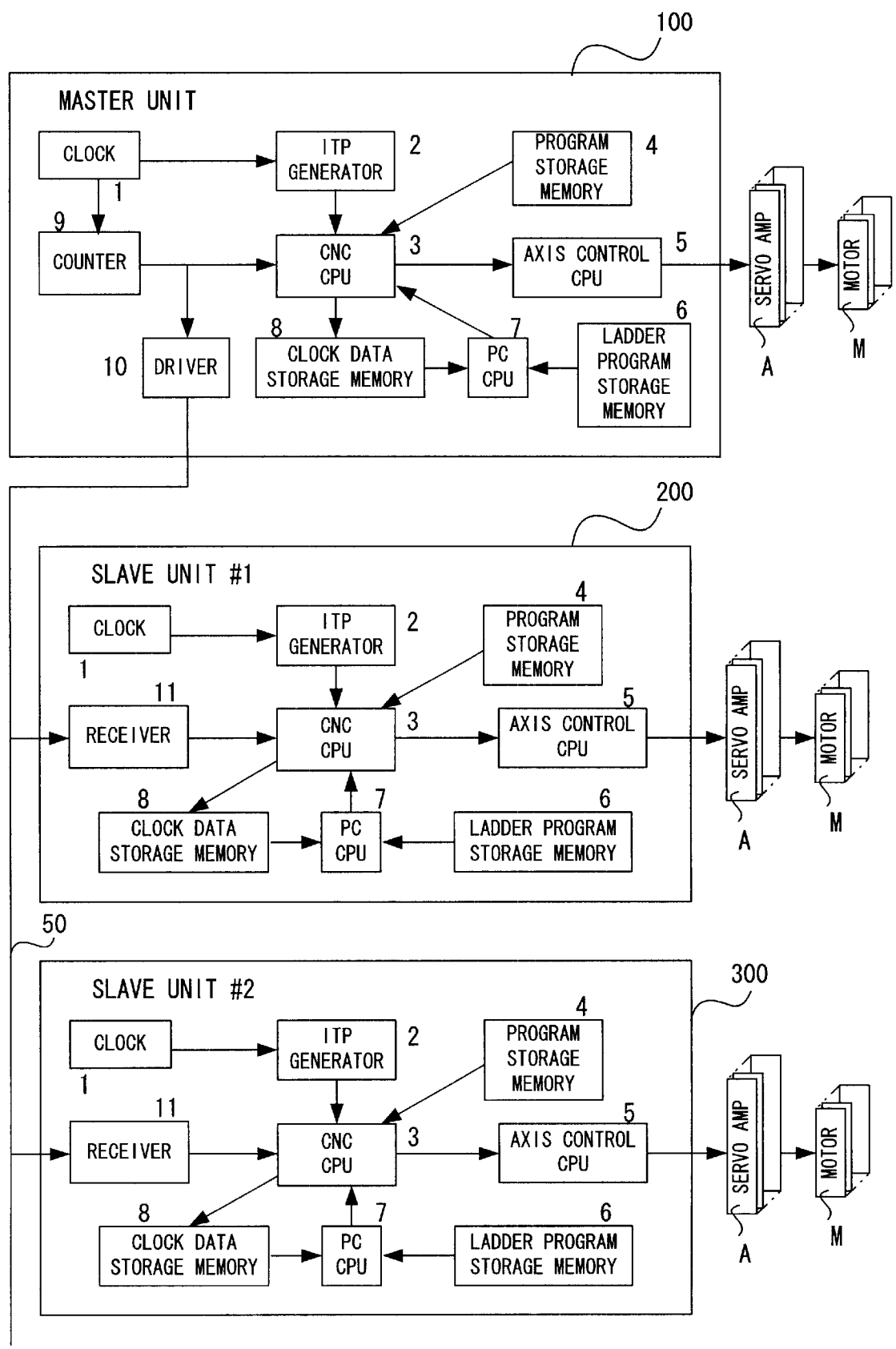
FIG. 1 is a block diagram of the principal parts of a first embodiment of the present invention.

FIG. 1 is a block diagram of the principal parts of a first embodiment of the present invention. In this first embodiment, a plurality of axes are divided into groups and controlled by a plurality of CNC devices, and these axes are controlled by achieving synchronization.

Of the plurality of CNC devices, one unit is treated as the master unit 100, and the other CNC devices are treated as slave units 200, 300, . . . FIG. 1 only shows a master unit 100, and 2 slave units 200, 300. A plurality of servo motors M, which drive axes, are connected via servo amplifiers A to the master unit 100, and each slave unit 200, 300.

Master unit 100 is constituted practically the same as a conventional CNC device, but it is different from conventional CNC devices in the fact that the master unit 100 is equipped with a counter 9 for generating clock data, a driver 10 for transmitting this clock data to slave units 200, 300, . . . , and clock data storage memory 8 for storing clock data.

Based on a clock signal from a clock (crystal oscillator) 1, ITP generating means 2 generates a pulse of a basic unit time of operation (hereinafter referred to as ITP). Further, the counter 9 generates clock data by counting the clock signals from the clock 1. This clock data is transmitted via cable 50 by driver 10 to each slave unit 200, 300, . . . Furthermore, this clock data is read in by CNC processor 3, and stored in clock data storage memory 8. As above, clock data generating means is constituted by this counter 9 and clock 1.

In program storage memory 4, there is stored a part program executed by a CNC processor 3. Further, in ladder program storage memory 6, there is stored a ladder program executed by a processor for program controller (hereinafter referred to as a PC processor) 7, and an axis control program for a program controller. These programs can be inputted and set in memory 4, 6 from a display device-equipped control panel not shown in the figure, or can be transmitted and inputted from a host computer via a communications interface, or can be inputted via a paper tape, a floppy disk, or an IC card.

The PC processor 7 starts up either the program stored in program storage memory 4, or the axis control program for a programmable controller stored in ladder program storage memory 6 on the basis of clock data stored in clock data storage memory 8, and the ladder program stored in ladder program storage memory 6.

CNC processor 3 calculates the amount of motion of each axis (axis controlled by the master unit) in ITP units of pulses outputted from ITP generating means 2, and outputs this value to axis control processor 5. Axis control processor 5, which received the amount of motion of each axis, drives and controls the motor M of each axis via a servo amplifier A.

The slave units 200, 300, . . . , like the master unit 100, is provided with a clock 1, ITP generating means 2, CNC processor 3, program storage memory 4, axis control processor 5, ladder program storage memory 6, PC processor 7, and clock data storage memory 8. However, the slave units 200, 300, . . . , are different from the master unit 100 in that the slave units 200, 300, . . . , are not equipped with clock data generating means (counter 9 and driver 10), but are equipped with a receiver 11 for receiving the clock data transmitted via the driver 10 of the master unit 100 and cable 50.

Clock data transmitted to a receiver 11 via cable 50 is read in by CNC processor 3 of a slave unit, and stored in clock data storage memory 8. A program is started up based on the clock data stored in this memory 8, and a ladder program stored in ladder program storage memory 6. Then, each axis of each slave unit 200, 300, . . . , is driven and controlled under the operations similar to the above-mentioned operation of the master unit 100. Furthermore, part programs to be executed by the CNC processors of each slave unit are stored beforehand in the program storage memory 4 of each slave unit 200, 300, . . . Further, a ladder program and programmable controller axis control program for each slave unit are stored in the ladder program storage memory 6 of each slave unit 200, 300, . . .

As described above, the master unit 100 and each slave unit 200, 300, . . . start up each program, and control the axes based on clock data. Consequently, each axis to be controlled by the master unit 100 and each slave unit 200, 300, . . . can also be either subjected to synchronized control, or unsynchronized control based on this clock data.

The synchronized control of each axis will be explained hereinbelow.

Figure 8:
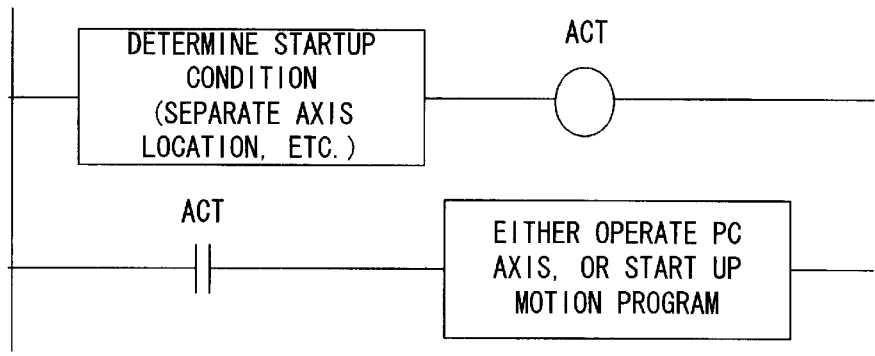
FIG. 8 is an example of a ladder program when operation commences in accordance with another condition than clock data.

In the ladder program storage memory 6 of the master unit 100, as shown in FIG. 8, there is stored a ladder program in which the startup condition of a certain axis is selected as an arrival of another axis at a predetermined position. In this case, when this startup condition is fulfilled, start signal ACT changes to "1", and either the operation of a certain axis is started in accordance with a sequence by the programmable controller, or a motion program is started by a part program related to a certain axis. In this way, this axis can be controlled, linked to the operation of another axis, that is, without relying on clock data.

Figure 9:
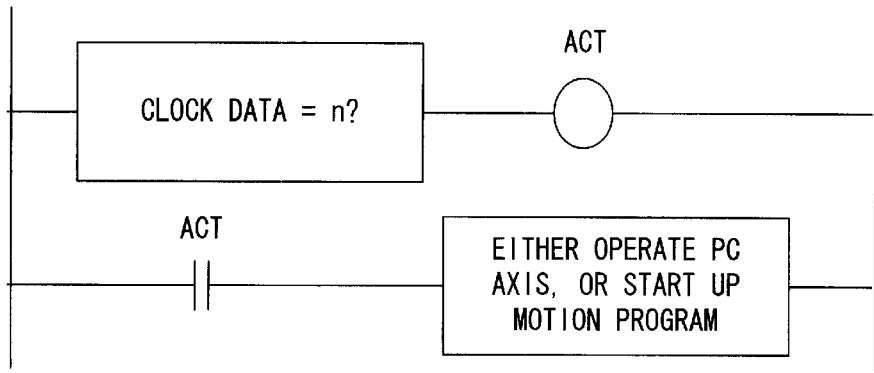
FIG. 9 is an example of a ladder program when operation commences in accordance with clock data.

Further, if a ladder program such as that shown in FIG. 9 is set beforehand in the ladder program storage memory 6 of the master unit 100 and/or a specified slave unit 200, 300, . . . , the start signal ACT changes to "1" when clock data reaches a predetermined value n, thereby starting up either an axis operation according to a sequence by a programmable controller, or a motion program, related to an axis of the master unit 100 and/or an axis of a specified slave unit 200, 300, . . .

Figure 2:
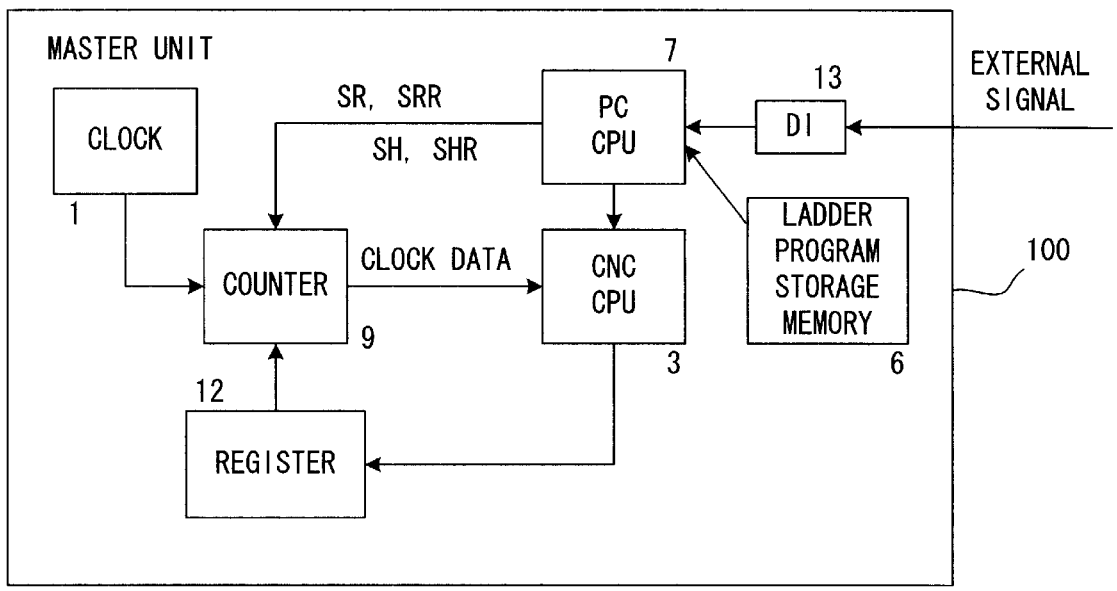
FIG. 2 is a block diagram of the principal parts of a master unit of a second embodiment of the present invention.

FIG. 2 is a block diagram of the principal part of a CNC device constituting a master unit 100 of a second embodiment of the present invention.

A master unit 100 according to this second embodiment is different from the master unit 100 shown in FIG. 1 (first embodiment) in that a reset signal SR of a counter 9, a reset release signal SRR, a hold signal SH, and a hold release signal SHR are outputted from a PC processor 7, in that a counter 9, which constitutes clock data generating means, is constituted so as to enable reset, hold, and the release thereof, and furthermore, in that output interval of clock data can be adjusted and override can be applied to the clock data.

Although omitted from FIG. 2, in master unit 100 according to the second embodiment as well, just like the master unit according to the first embodiment shown in FIG. 1, there are provided ITP generating means 2, program storage memory 4, an axis control processor 5, clock data storage memory 8, and a driver 10, and the master unit 100 of the second embodiment operates in the same way as the master unit 100 of the first embodiment. In FIG. 2, there is shown only constitutional elements related to the operations other than the operations the master unit 100 of the first embodiment shown in FIG. 1 performs, which the master unit 100 of the second embodiment performs.

The clock data-generating counter 9 outputs clock data by either counting up 1 or counting down 1 each time a specified number of clock signals from the clock 1 are counted. If this counter 9 is reset to zero, clock data is initialized (cleared). Further, if the count of the counter 9 is put on hold, either count up or count down can be stopped.

That is, if the counter 9 count is put on hold, the progress of the clock is discontinued, and if hold is released, the progress of the clock is restarted. Furthermore, if the counter 9 is constituted such that the number of clock signals for either counting up 1 or counting down 1 can be adjusted, the clock data output interval can be changed, and clock data override can be constituted.

Accordingly, in this second embodiment, a PC processor 7 outputs to counter 9 the above-mentioned reset signal SR, hold signal SH, and the release signals therefore SRR, SHR, either by a signal inputted via an input circuit 13 from a control panel or the like not shown in the figure, or by an internal signal generated by the execution of a ladder program stored in ladder program storage memory 6, thereby performing reset, hold, and release thereof for this counter 9. Furthermore, the second embodiment is constituted such that a register 12 is provided, and each time a value set in this register 12 is counted, the counter either counts up or counts down as clock data, and outputs the clock data. And then, based on either an external or internal signal, PC processor 7 changes, via CNC processor 3, the value to be set in this register.

Consequently, the interval of clock data to be outputted from the counter 9 is changed, and the speed of the axis to be driven based on this clock data changes. That is, by applying override to clock data, the operating speed of each axis can be overridden.

Figure 3:
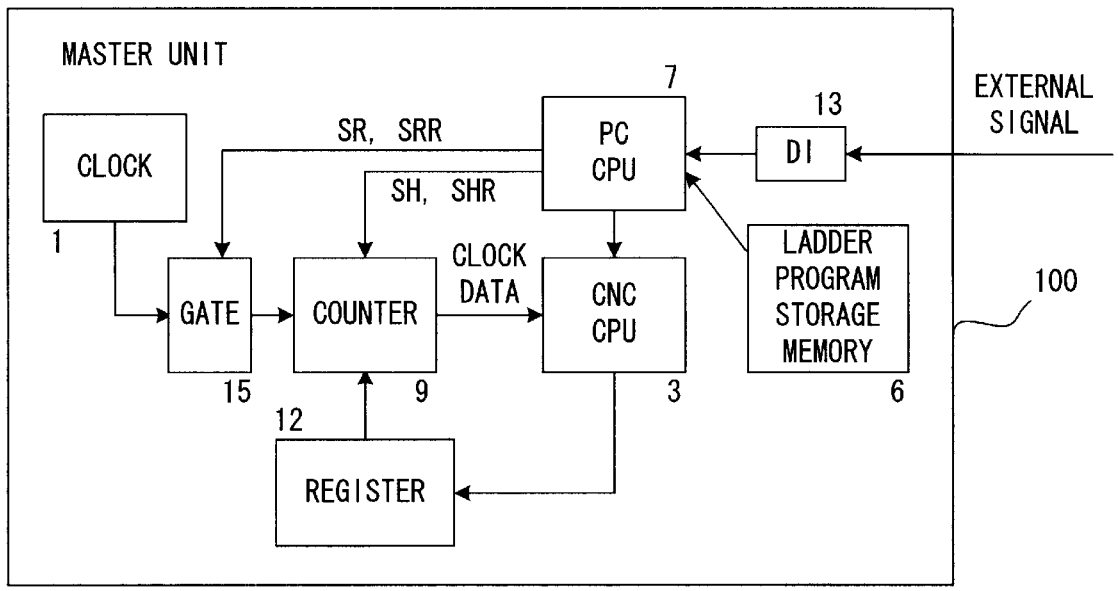
FIG. 3 is a block diagram of the principal parts of a master unit, showing a first modified example of the second embodiment.

FIG. 3 shows a first modified example of master unit 100 of this second embodiment. In the master unit 100 shown in FIG. 3, counter 9 has neither hold function nor release function therefor.

A signal from the clock 1 is inputted to the counter 9 via a gate 15. When this gate 15 is closed by a hold signal SH from the PC processor 7, the inputting of a clock signal to the counter 9 is discontinued, and the counter 9 maintains the total number at that time. Then, when the PC processor 7 outputs a hold release signal SHR to the gate 15, the gate 15 opens, a clock signal from the clock 1 is inputted to the counter 9 once again, and counting is restarted.

Figure 4:
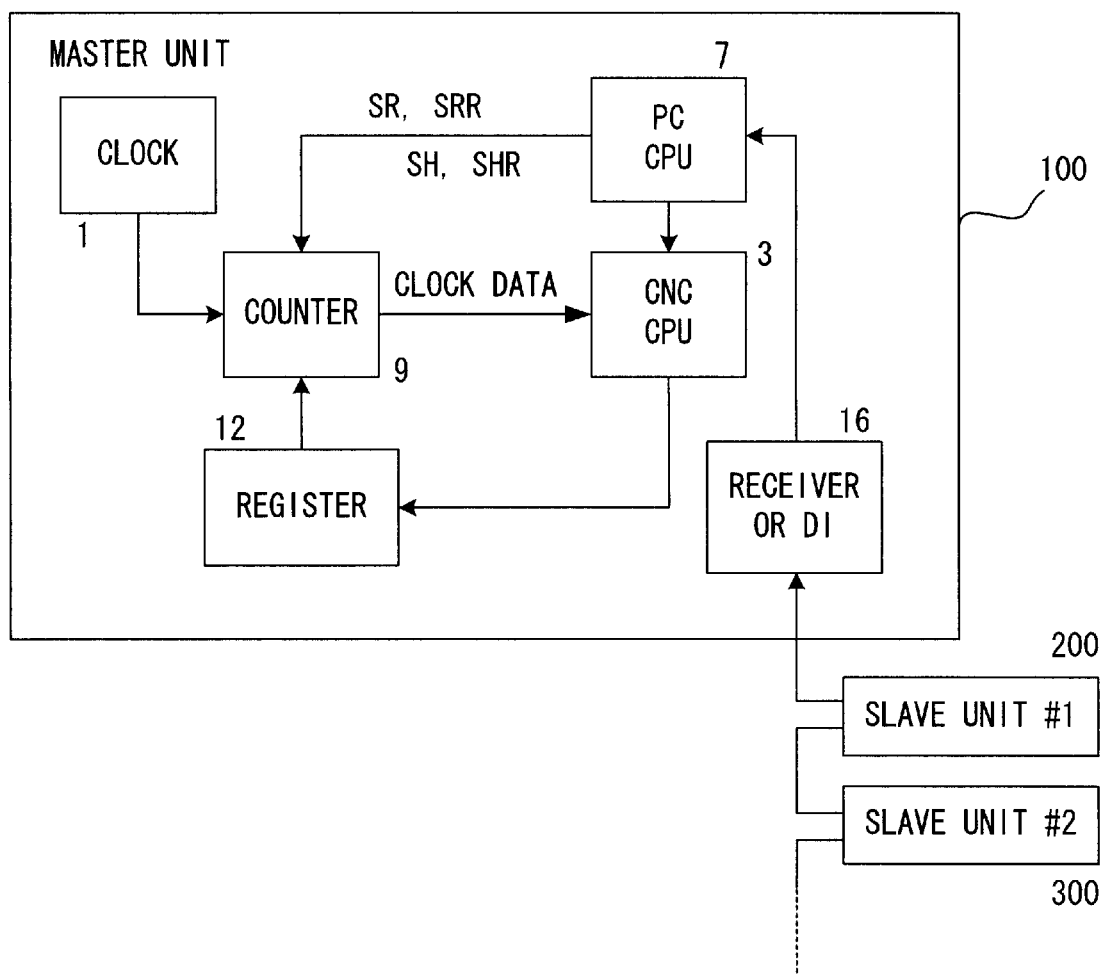
FIG. 4 is a block diagram of the principal parts of a master unit, showing a second modified example of the second embodiment.

FIG. 4 shows a second modified example of the master unit 100 of the second embodiment. In the master unit 100 of FIG. 4, resetting, holding, and releasing of resetting or holding of the counter 9, clock data overriding and other operations can be performed from the slave units 200, 300, . . . .

In this second modified example of the second embodiment, slave units 200, 300, . . . are connected in a daisy chain mode. And then, the digital signals for resetting, holding and releasing of resetting or holding of the counter 9 and a clock data override value, outputted from each slave unit, are received by either a receiver, or an input circuit (not illustrated) in the master unit 100. Then, the PC processor 7, based on this received signal, sets in counter 9 any of a reset signal SR, hold signal SH, and the release signals therefore SRR, SHR, and sets in register 12 a value for overriding a clock data.

If the cable 50 for transmitting clock data is for two-way communications, the above-mentioned reset signal SR, hold signal SH, and the release signals therefor SRR, SHR, and signal for override can be transmitted with this cable 50.

Figure 5:
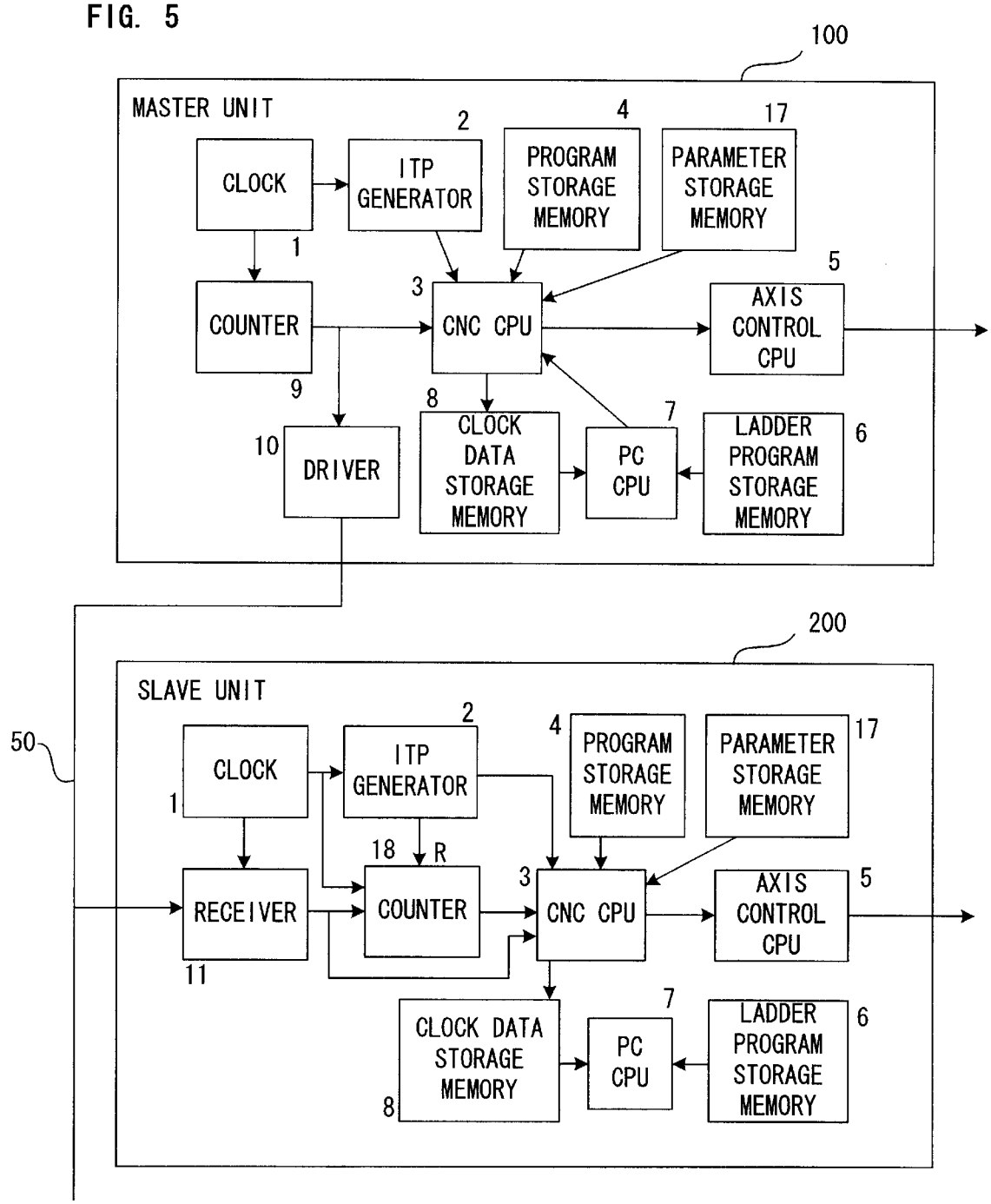
FIG. 5 is a block diagram of the principal parts of a third embodiment of the present invention.

FIG. 5 is a block diagram of the principal parts of a CNC device constituting a master unit 100 of a third embodiment of the present invention. According to this third embodiment, delays in the transmission of clock data from the master unit 100 to each slave unit 200, 300, . . . are corrected, and more highly accurate synchronized control is achieved.

This third embodiment shown in FIG. 5 is different from the first embodiment shown in FIG. 1 in that a parameter storage memory 17 is provided in the master unit 100, and a parameter storage memory 17 and a counter 18 are provided in each of the slave units (only slave unit 200 is shown in FIG. 5).

Transmission delay time is the total of delay time in a driver 10 of the master unit, delay time in the cable 50 determined by the length of the cable, and delay time in a receiver 11 of a slave unit.

Of these, delay time resulting from a driver 10 is common to each slave unit. Further, delay time resulting from a receiver 11 may differ for each slave unit, but the differences of delay times are slight. However, the length of cable 50 will differ for each slave unit. Therefore, transmission delays for each slave unit will be determined entirely by the length of cable 50. In other words, the biggest transmission delay will occur in the slave unit which is connected to the master unit 100 by the longest cable 50.

Accordingly, it is supposed that to n slave units which are connected to one master unit 100, a number from No. 1 to No. n is assigned in order from the one having the shortest cable to the longest cable to the master unit 100 (The n-th slave unit is connected to the master unit 100 with the longest cable 50.).

Here, the transmission delay resulting from the length of the cable 50 for the i-th ($1 \leq i \leq n$) slave unit is expressed as $Di$. Further, the total of delay time resulting from a driver 10 and delay time resulting from a receiver 11 is expressed as $D0$, considering that there is no difference between slave units for either of these delay times.

By so doing, it is possible to express the transmission delay when data is transmitted from the master unit 100 to the i-th slave unit as $$D0+Di$$

Transmission delay is maximum in a transmission to the n-th (i=n) slave unit. That is, maximum transmission delay becomes $$D0+Dn$$

In the parameter storage memories 17 of the i-th slave unit, there is stored a value obtained by subtracting transmission delay at the i-th slave unit from transmission delay at the n-th slave unit (maximum transmission delay). That is, $$D0+Dn-(D0+Di)=Dn-Di$$

is stored. Of course, zero is stored in the parameter storage memory of the n-th (the last) slave unit (where i=n). D0+Dn is stored in the parameter storage unit of the master unit.

Here, it is supposed that clock data "t" is outputted from counter 9 of the master unit 100. By so doing, the CNC processor 3 of the master unit 100 stores in its own clock data storage memory 8

$$t-(D0+Dn)$$

obtained by subtracting (Do+Dn) stored as a correction parameter in parameter storage memory 17 from this clock data "t", as corrected clock data.

This signifies that clock data of the master unit 100 turns "t" after the lapse of (D0+Dn) from the point of time when the counter 9 of the master unit 100 outputted clock data "t".

On the other hand, the i-th slave unit CNC processor 3 reads clock data "t" outputted by the counter 9 of the master unit after a lag of the transmission delay time (D0+Di). Then, CNC processor 3 of this i-th slave unit stores in the clock data storage memory 8 of the i-th slave unit $$t-(Dn-Di)$$

obtained by subtracting (Dn−Di) stored in the parameter storage memory 17 from read-in clock data "t", as corrected clock data.

This signifies that the clock data of the i-th slave unit turns "t" after the lapse of (Dn−Di) from the point of time when t−(Dn−Di) was stored in this clock data storage memory 8. In other words, this means that clock data of the i-th slave unit turns "t" after the lapse of $$(D0+Di)+(Dn-Di)=D0+Dn \quad (1)$$

from the point of time when the clock 1 of the master unit 100 outputted clock data "t". Here, the above (D0+Di) is, as explained above, the time (transmission delay time) from the output of clock data "t" by the clock 1 of the master unit 100 to the reception of the clock data by the CNC processor 3 of the i-th slave unit.

The right side of the above Formula (1) does not rely on slave unit number i. This signifies that clock data of every slave unit turn "t" at a time when a fixed time period (D0+Dn) lapses from the point of time when the clock 1 of the master unit 100 outputted clock data "t".

Furthermore, as explained above, when (D0+Dn) lapses from the point of time when the master unit 100 clock 1 outputted clock data "t", "t" is stored in the clock data storage memory 8 of the master unit, too.

Therefore, the same clock data is always stored at the same time in the clock data storage memory 8 of the master unit and that of every slave unit.

As explained above, since the master unit and every slave unit share the same clock data in its clock data storage memories 8, it is possible to execute a program which causes a certain slave unit to start up in synchronization with another slave unit, based on the corrected clock data stored in this clock data storage memory 8.

Data D0 (total of a delay time in a driver 10 and a delay time in a receiver 11), which is stored in the parameter storage memory 17 of the master unit 100, is determined once the drivers 10 and receivers 11 to be used in a CNC system are determined. Further, transmission delay Di (including Dn) resulting from the length of cable 50, which is stored in the parameter storage memory 17 of the master unit 100 and each slave unit, is obtained by multiplying a cable length by the delay time per unit length of cable (a fixed value). Therefore, when the system is determined, the transmission delay Di resulting from the length of cable 50 is automatically determined by inputting into the parameter storage memory 17 the length of the cable up to the i-th slave unit using manual inputting means not shown in the figure.

Figure 10:
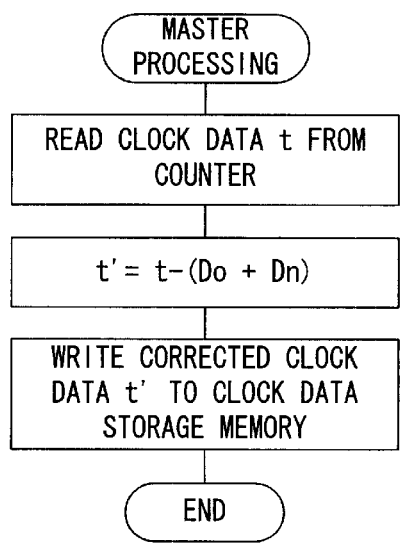
FIG. 10 is a flowchart of the processing the master unit performs for correcting a transmission delay.

FIG. 10 is a flowchart of clock data correction processing, which the CNC processor 3 of the master unit 100 executes every ITP cycle.

As explained above, clock data "t" is read out from counter 9, correction data (D0+Dn) stored in the parameter storage memory 17 is subtracted from this read-out clock data t, and the result is stored in the clock data storage memory 8 as corrected clock data t' (=t−(D0+Dn)).

Figure 11:
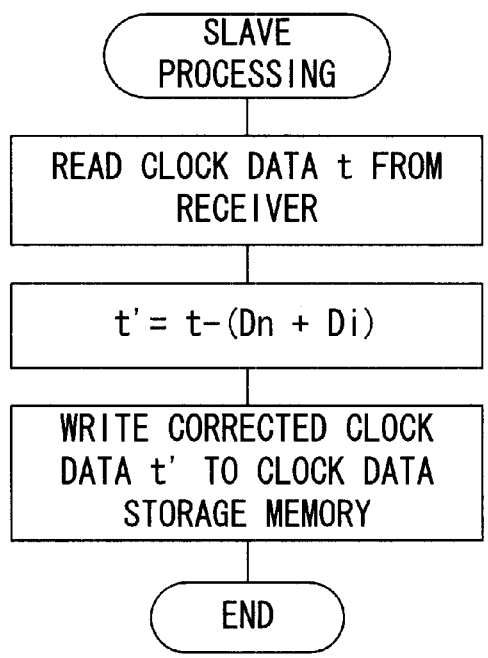
FIG. 11 is a flowchart of the processing the slave unit performs for correcting a transmission delay.

FIG. 11 is a flowchart of clock data correction processing, which the processor 3 of the i-th slave unit CNC executes every ITP cycle.

As explained above, clock data t is read out from receiver 11, the total value of transmission delay (Dn−Di) is subtracted from this read-out clock data t, and the result is stored in clock data storage memory 8 as corrected clock data t' (=t−(Dn−Di). However, it should be noted that, as described above, clock data t is read from the receiver 11 of a slave unit at a time when time period (D0+Di) lapses from the point of time when the counter 9 of the master unit 100 generated clock data "t".

In the above-mentioned clock data correction method, CNC processor 3 directly reads the output of the receiver 11 of each slave unit (FIG. 5). Instead of this clock data correction method, following correction method can also be adopted.

In this correction method, matching is performed for the specific clock that each slave unit has. The clock 1, which the master unit 100 has, will differ physically from the clock 1, which each slave unit has. Ordinarily, a CNC system has an ITP cycle as a basic unit time of operation, and an operation is executed in this ITP cycle unit. Since the clock of each unit differs, the time at which this ITP cycle begins will differ for each unit. Further, the width of an ITP cycle is not strictly the same for each unit. This is because there is error, though slight, in the clock itself. Even if the start time of the clocks of all the units could be matched up, this slight width error accumulates over a long period of time, so that a time discrepancy occurs. This discrepancy constitutes the major hindrance to the complete synchronization of a plurality of units.

To cope with the above problem, clock data shared by all slave units is outputted from the master unit 100 to each slave unit at an extremely short fixed interval. Here, this "fixed interval" is treated as the ITP cycle. Then, when this clock data reaches a certain slave unit, this slave unit makes a determination as to where within an ITP cycle of this slave unit (this ITP cycle differs from the ITP cycle of the master unit) the clock data arrived. Based on this determination, the value of the clock data regarding the starting time of the ITP cycle in this slave unit is obtained. To achieve this operation, each slave unit is provided with ITP generating means 2, and a counter 18 as shown in FIG. 5. This counter 18, after being reset by an ITP signal outputted from ITP generating means 2, counts up a clock signal of clock 1. Further, when receiver 11 receives clock data, the counter 18 stops this count up. In this manner, the point within an ITP cycle at which clock data was received is determined, so that an error between the clock data of the master unit and that of a slave unit is found.

For example, if clock data arrival monitoring is performed with a clock that is 100 times faster than an ITP cycle width, it can be found at which of the 100 parts into which an ITP cycle is divided the clock data arrived. However, since an intermediate value between a clock and the next clock cannot be measured, and constitutes an error, synchronization deviates by that degree. However, by raising the speed of a clock data arrival monitoring clock (that is, by raising resolution), it is possible to raise synchronization accuracy.

Figure 13:
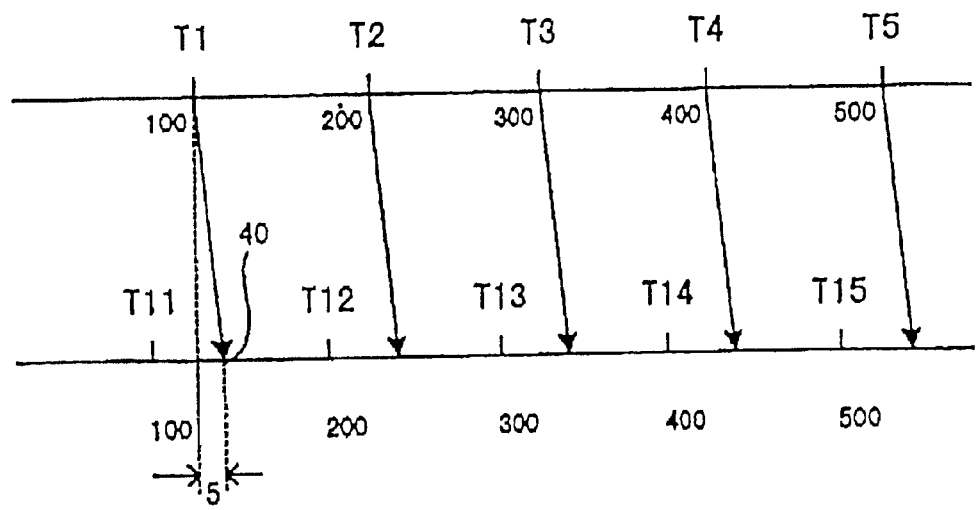
FIG. 13 is a diagram illustrating the principle of the transmission delay correction method shown in FIG. 12.

FIG. 13 shows an example of clock data, which counts up clock signals in 100's for each ITP cycle of master unit 100.

Clock data t of "100", "200", "300" . . . is outputted from the master unit 100 for each ITP cycle T1, T2, T3, . . . A slave unit is provided with a counter 18, which is reset by its own ITP signal, and counts up clock signals as described above. Further, when receiver 11 receives clock data, this counter 18 stops counting.

Furthermore, the CNC processor 3 of a slave unit reads the value of the counter 18 each ITP cycle, corrects a received clock data "t" in accordance with this read value, an ITP cycle, delay times at a driver and a receiver, and transmission delay resulting from a cable, and stores the corrected clock data in the clock data storage memory 8.

In the example of FIG. 13, it is supposed that clock data t=100 was received when the value of a counter 18 between ITP cycle T11 and T12 was, for example, "40" (40/100 of an ITP). Further, it is supposed that the total (=D0+Di) of the total of delay time at driver 10 of the master unit 100 and delay time D0 at the receiver of a slave unit, and transmission delay Di resulting from a cable was, for example "5". Thus, when a slave unit receives clock data t=100, the count value of the master unit counter 9 is "105". Further, because clock data is received when the count value of the counter 18 in the slave unit is "40", and since an ITP cycle corresponds to 100 clock signals, the next ITP signal T12 is to be generated when clock data t is received and 60 clock signals are counted. Accordingly, at ITP signal T12, clock data that has been corrected to 100+5+60=165 is stored in the clock data storage memory 8.

That is, CNC processor 3 of the i-th slave unit determines corrected clock data t' by carrying out the calculation of Formula (2) hereinbelow, and stores same in clock data storage memory 8.

$$t' = t + D0 + Di + Q - P \quad (2)$$
$$= t - P + (Q + D0 + Di)$$

Here, D0 in the above formula is the total of delay time at the receiver of the i-th slave unit, Di is transmission delay resulting from a cable from the master unit to this i-th slave unit, Q is the number of clock signals between ITP cycle widths, t is clock data, and P is the value of the counter 18 when the slave unit receives the clock data.

When executing this correction method as well, delay time at the driver of the master unit, delay time at a receiver, and delay time per unit length of cable are stored beforehand in the parameter storage memory 17 the same as in the previous method. Then, once a system has been determined, the length of cable for each of slave units is set as a parameter. In accordance therewith, each slave unit finds the transmission delay Di resulting from a cable by multiplying the delay time per unit length by the set length of the cable concerned, and stores, as clock time correction data, the value "Q+D0+Di", obtained by adding this delay "Di" and the total value of delay times at a driver and receiver "D0" to the number of clock signals Q within an ITP cycle.

Figure 12:
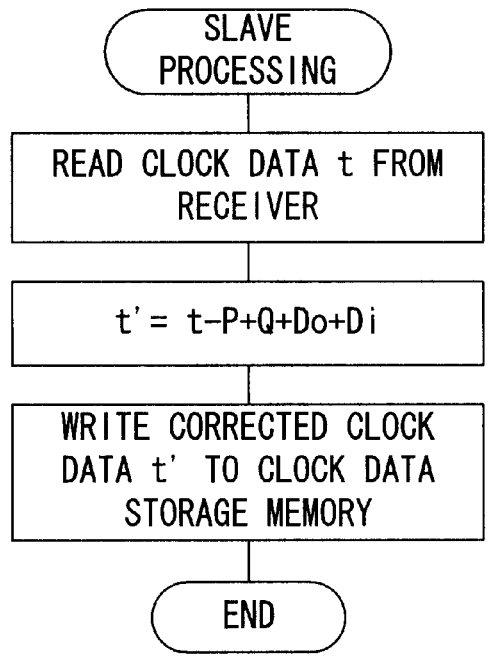
FIG. 12 is a flowchart of the processing the slave unit performs according to another method for correcting transmission delay.

And then, when operation is executed, the CNC processor 3 of each slave unit executes the processing indicated by the flowchart in FIG. 12 for each ITP cycle, and stores corrected clock data t' in the clock data storage memory 8.

First, clock data t sent from the master unit 100 is read in, and the count value P of the counter 18 is read in. Next, the corrected clock data t' is obtained by performing the computations of the above-mentioned Formula (2), this corrected clock data t' is stored in the clock data storage memory 8, and this processing is ended.

Furthermore, on the master unit 100 side, because clock data t outputted from the counter 9 is stored in the clock data storage memory 8 as it is, processing in the master unit is omitted.

The PC processors 7 of the master unit 100, and slave units 200, 300, . . . synchronize, drive and control each axis by starting either a part program stored in the program storage memory 4, or an axis control program for a programmable controller stored in the ladder program storage memory 6, based on the clock data stored in the clock data storage memory 8, and a ladder program stored in the ladder program storage memory 6.

Figure 6:
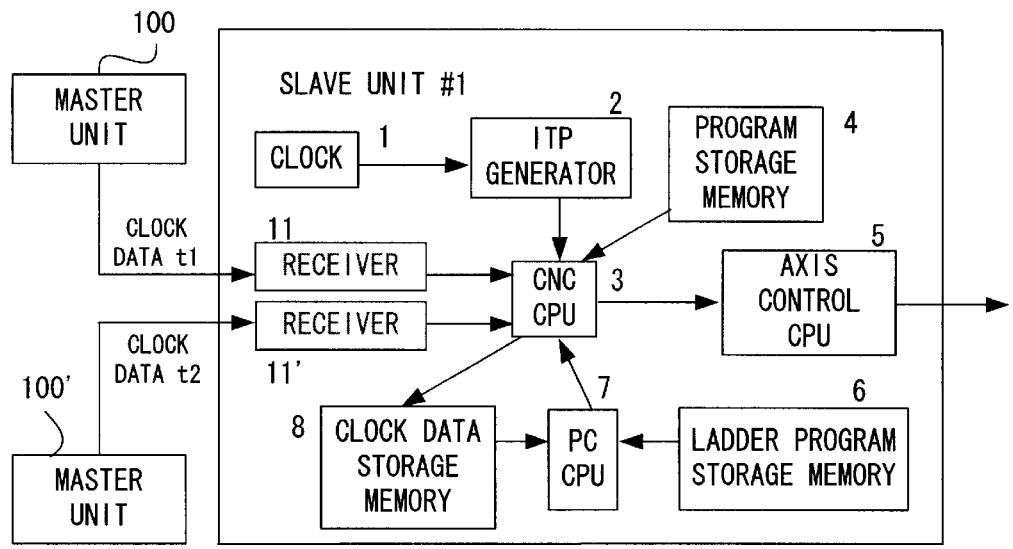
FIG. 6 is a block diagram of the principal parts of a fourth embodiment of the present invention.

FIG. 6 is a block diagram of the principal parts of a CNC system constituting a master unit 100 of a fourth embodiment of the present invention. This fourth embodiment is different from the embodiment shown in FIG. 1 in that 2 master units 100, 100' are provided, and 2 types of clock data t1, t2 are generated, and such that 2 receivers 11, 11' are provided in all (or a number of selected) slave units, and are able to receive clock data t1, t2, respectively.

A slave unit is constituted such that clock data t1 and clock data t2 are received, and the operation of axes is controlled on the basis of clock data t1, and the operation of other axes is controlled on the basis of clock data t2. In addition, the operation of still other axes are controlled based on the start up condition determined by the position of another axis, not based on these clock data. In this manner, by providing a plurality of master units for outputting clock data, making clock data of 2 or more types, and providing in a slave unit the number of receivers for the types of clock data that this slave unit requires, axes can be controlled for each type of clock data with synchronization.

That is, in any one slave unit, axes, which are synchronized by each type of clock data, can be selectively grouped such that an axis belonging to a first group is synchronized and operated on the basis of clock data t1, and an axis belonging to a second group is synchronized and operated on the basis of clock data t2. Furthermore, axes, which are driven by other conditions without relying on clock data, can also be selected such that an axis belonging to a third group is driven by having the current position of another axis as a startup condition.

Figure 7:
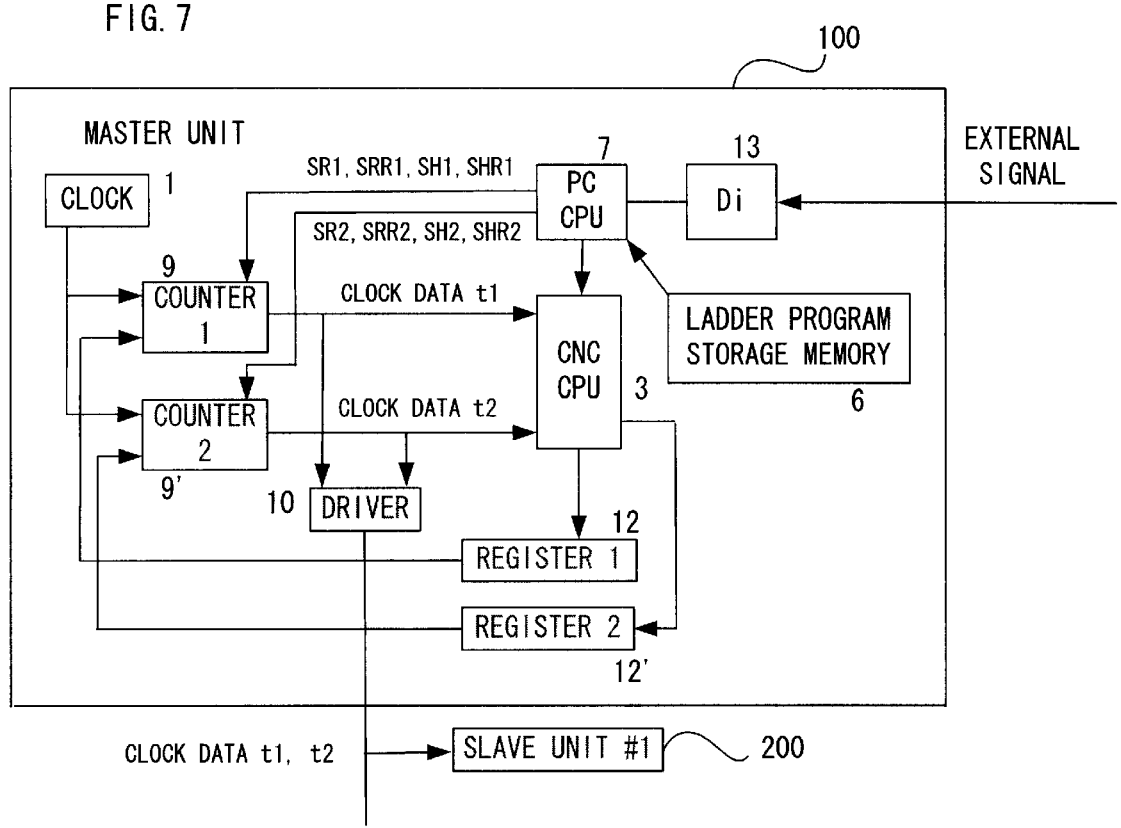
FIG. 7 is a block diagram of the principal parts of a fifth embodiment of the present invention.

FIG. 7 is a block diagram of the principal parts of a CNC system constituting a master unit 100 of a fifth embodiment of the present invention. This fifth embodiment is constituted so as to provide 2 counters 9, 9', and to generate 2 types of clock data.

A first counter 9 generates and outputs a first clock data t1 of a time interval, which is set by a first register 12. Further, a second counter 9' generates and outputs a second clock data t2 of a time interval, which is set by a second register 12'. The time interval of the first clock data t1 need not be identical to the time interval of the second clock data t2.

Further, the first counter 9 is reset, held, and released, by reset signal SR1, hold signal SH1, and release signals SRR1, SHR1 outputted from the PC processor 7, respectively. Similarly, the second counter 9' is reset, held, and released, by reset signal SR2, hold signal SH2, and release signals SRR2, SHR2 outputted from the PC processor 7, respectively.

Furthermore, by changing the values set in the first and second registers 12, 12' it is possible to change the time intervals of first and second clock data t1, t2. That is, override can be applied to first and second clock data t1, t2.

Furthermore, the types of clock data can be increased by further increasing pairs of counters and registers.

Figure 14:
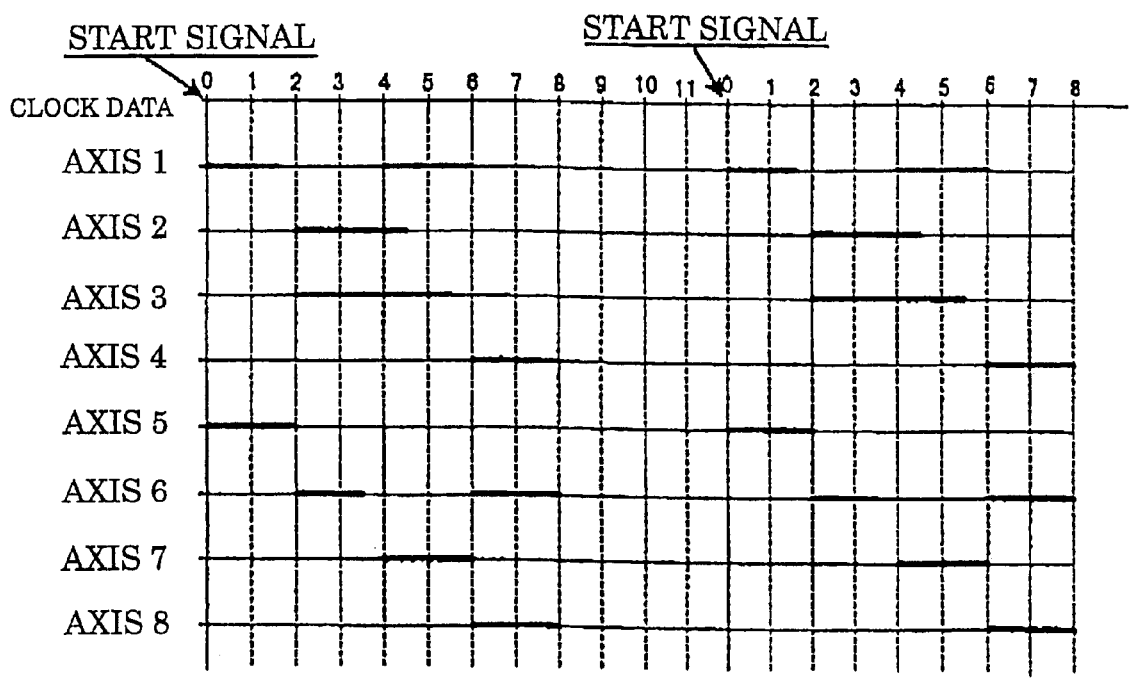
FIG. 14 is a timing chart of a first example of synchronized operation according to the present invention.

FIG. 14 shows one example of operating states when all axes are being operated in synchronism with each other using clock data.

Axis 1 and axis 5 commence synchronized operation at time 0, and axis 3 and axis 6 commence synchronized operation at time 2. Furthermore, axis 1 and axis 7 commence synchronized operation at time 4, and axis 4, axis 6, and axis 8 commence synchronized operation at time 6.

Figure 15:
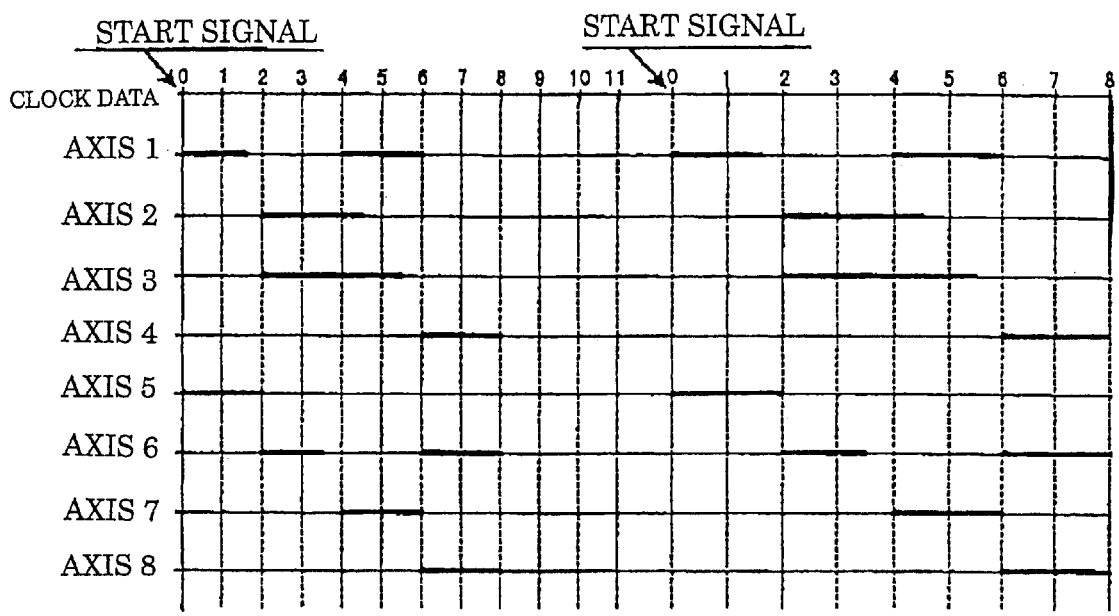
FIG. 15 is a timing chart of a case where override is applied at the second cycle in the first example of synchronized operation of FIG. 14.

FIG. 15 shows operating states when override is applied to clock data in the second cycle in the operating example shown in FIG. 14.

If override is applied to clock data, then override is applied to all axes, and cycle time in the second cycle differs from the cycle time of the first cycle (in the example shown in FIG. 15, the cycle time of the second cycle becomes longer.).

Figure 16:
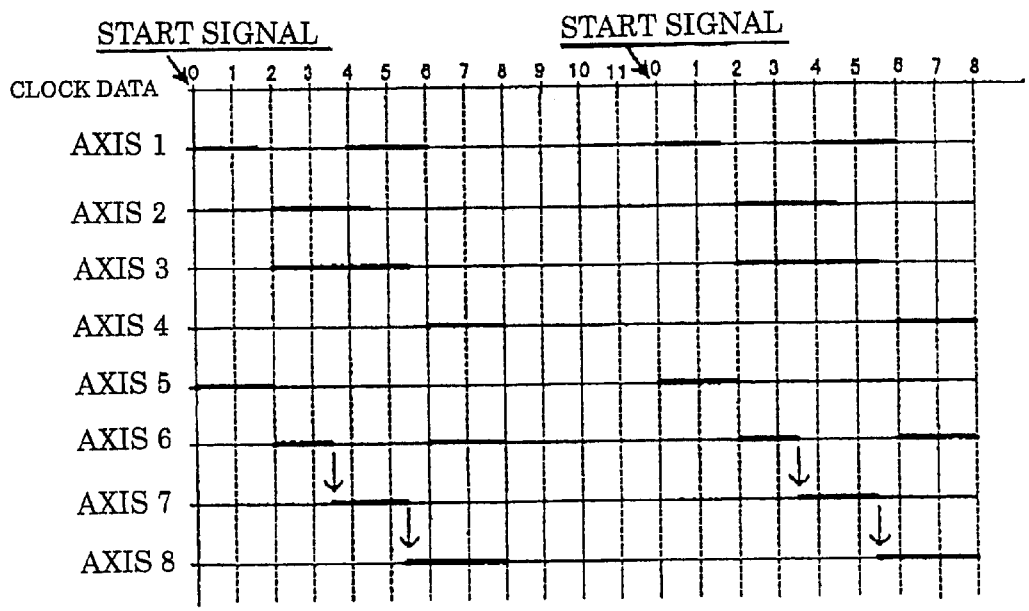
FIG. 16 is a timing chart of a second example of synchronized operation according to the present invention.

FIG. 16 shows an example of a case where one portion of the axes operate synchronously, and the other portion of the axes operate under other conditions.

Axis 1 and axis 5 commence synchronized operation at time 0, and axis 2, axis 3, and axis 6 commence synchronized operation at time 2. However, axis 7 commences operation at the end of axis 6 operation without relying on clock data. Further, axis 1 commences operation once again at time 4 on the basis of this clock data. Axis 8 commences operation at the end of axis 7 operation without relying on clock data. And then, axis 4 and axis 6 commence synchronized operation once again beginning at time 6.

Figure 17:
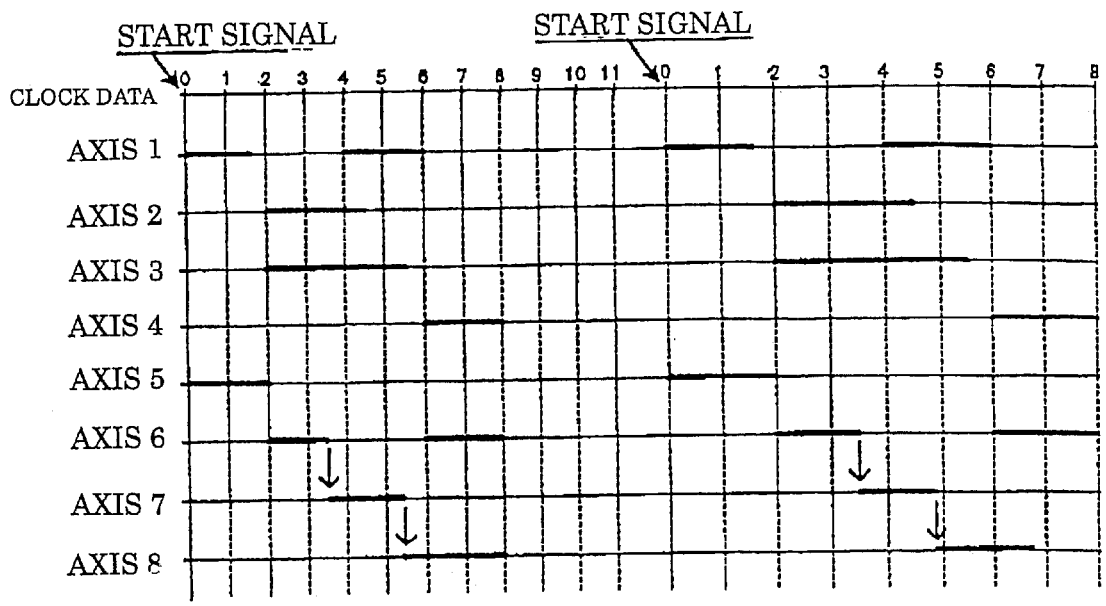
FIG. 17 is a timing chart of a case where override is applied at the second cycle in the second example of synchronized operation of FIG. 16.
Figure 18:
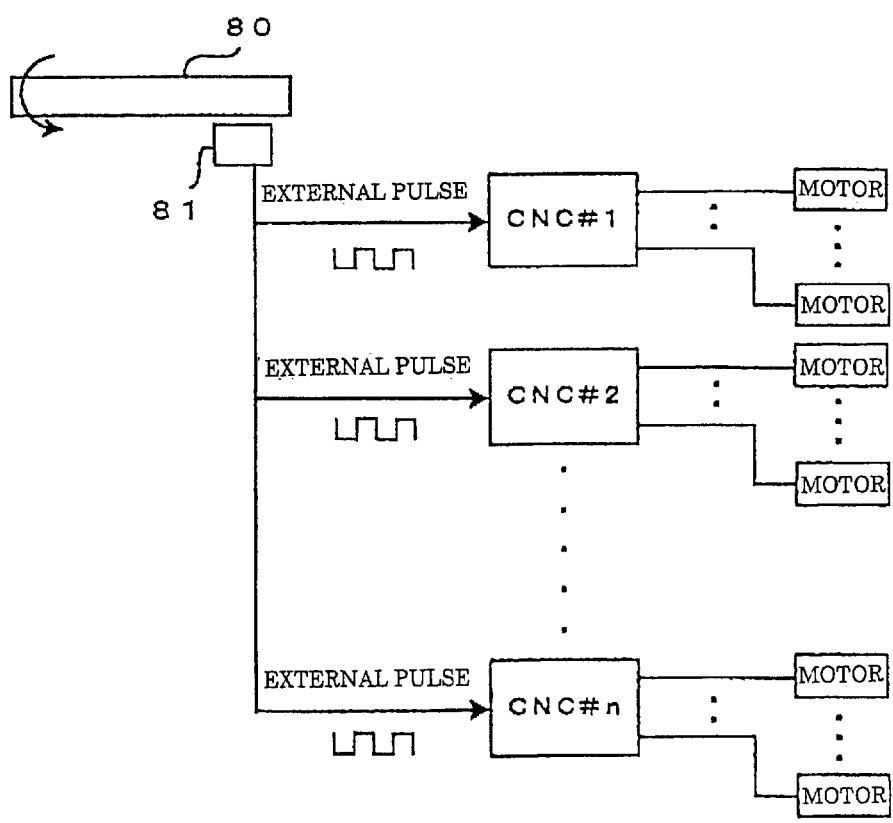
FIG. 18 is a block diagram of the principal parts of a conventional example of an external pulse synchronization mode in which a master axis is provided externally.
Figures 19, 20:
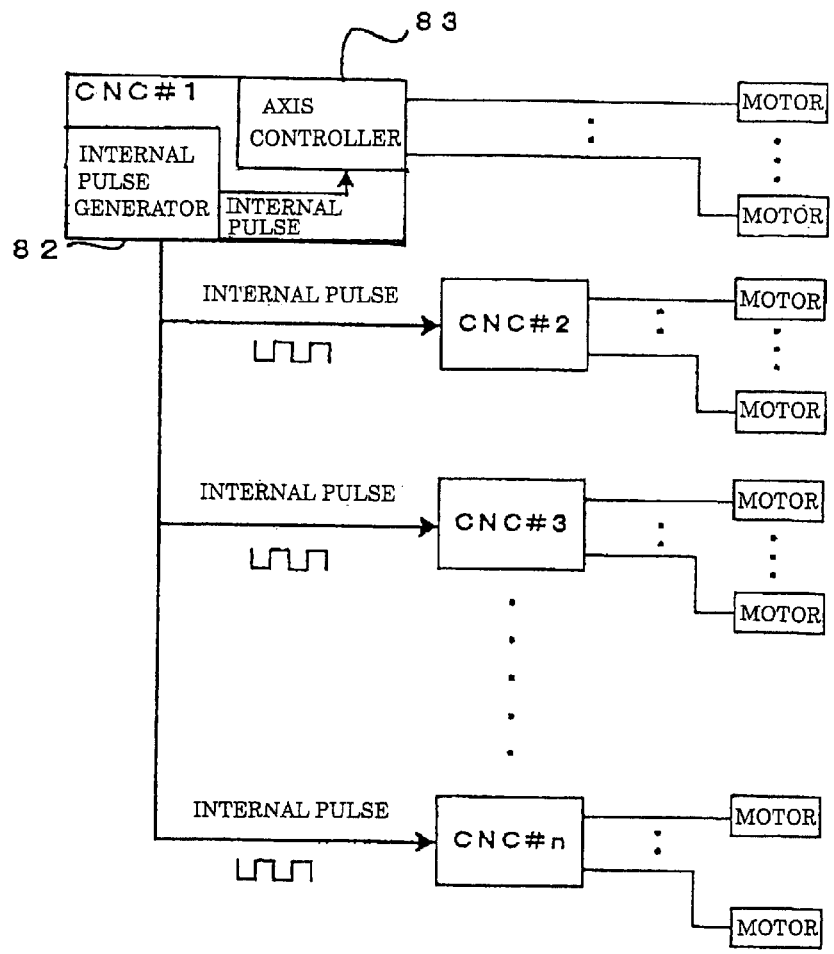
FIG. 19 is a block diagram of the principal parts of a conventional example of an internal pulse synchronization mode in which a virtual master axis is provided inside a master unit.
FIG. 20 is an example of a data table, which has been used for synchronizing the position of a slave axis to the position of a master axis.

FIG. 17 show operating states when override is applied to clock data in the second cycle, for the case of the operating example shown in FIG. 16.

As shown in FIG. 17, because axis 7 and axis 8 start up without relying on clock data, even if override is applied to clock data, these axes are not affected thereby. Consequently, the operating times of axes other than axis 7 and axis 8 undergo change in accordance with override, but the operating times of axis 7 and axis 8 do not change. As a result thereof, in a case such that, for example, axis 7 and axis 8 operate on the peripheral portion of a machine, and the next cycle cannot commence until a certain amount of time (absolute time) has passed following the completion of axis 8 operation, even if override is applied to clock data, and override is applied to the entire machine, it is possible to end the operation thereof quickly without applying override to these axis 7 and axis 8 of the peripheral portion. In accordance therewith, the shortening of cycle time can be attempted. When override is applied to the above-mentioned axis 7 and axis 8 as shown in FIG. 15, in a case in which the completion of axis 8 operation is delayed, and operation does not proceed to the next cycle until the passage of a prescribed time thereafter, the start time of the next cycle is delayed by the amount of this delay of the completion of operation of axis 8, and overall operation time becomes longer.

What is claimed is:

1. A numerical control system which comprises one numerical control device constituting a master unit, and one or more numerical control devices constituting slave units, and the axes controlled by these different numerical control devices are controlled in synchronism with each other, the numerical control system comprising:
    a master unit comprising:
        a clock data generating unit generating clock data by counting a clock signal from a clock by either counting up or counting down at a prescribed time interval;
        a transmitting unit transmitting the clock data generated by said clock data generating unit to said slave unit from said master unit;
        a master storage unit storing a program including motion commands of an axis controlled by this master unit; and
        a master starting unit starting up said program based on said clock data;
    each of said numerical control devices constituting slave units comprising:
        a slave storage unit storing a program including motion commands of an axis controlled by each slave unit; and
        a slave starting unit starting up said program based on said clock data from said master unit.

2. The numerical control system according to claim 1, wherein said master unit and said slave unit further comprise:
    a startup time storage unit storing startup time data for starting up said program; and
    a startup unit starting up said program at a startup time stored in the startup time storage unit.

3. The numerical control system according to claim 1, further comprising a controlling unit controlling a count operation of said clock data generating unit by a signal from either outside or inside of the system.

4. The numerical control system according to claim 1, wherein said master unit and slave unit comprise an adjusting unit adjusting clock data to cope with a delay caused by clock data transmission.

5. The numerical control system according to claim 1, wherein said slave unit comprises an adjusting unit adjusting clock data to cope with a delay caused by clock data transmission, and a discrepancy of a reference unit time of an operation.

6. The numerical control system according to claim 1, further comprising a starting unit starting up a program including motion commands of each axis without relying on said clock data, and which, in a certain section, synchronizes operation of axes of different numerical control devices, and in other different section, operates without synchronization.

7. The numerical control system according to claim 1, wherein said master unit is provided with a plurality of generating units generating a plurality of clock data and transmitting said plurality of clock data, and said slave unit is constituted so as to receive said plurality of clock data, and specified clock data to be used for starting up the program can be selected from among said plurality of clock data for each axis of a slave unit, thereby allowing to control each axis in synchronism with each other in a plurality of groups.

8. The numerical control system according to claim 1, wherein the master unit comprises a plurality of master units, said clock data is generated individually by each of the master units, and a plurality of clock data is transmitted, and said slave unit is constituted so as to receive said plurality of clock data, and specified clock data to be used for starting up the program can be selected from among said plurality of clock data for each axis of a slave unit, thereby allowing to control each axis in synchronism with each other in plurality of groups.

9. The numerical control system according to claim 1, further comprising providing the master unit with a plurality of master units, said clock data is generated individually by each of the master units, and a plurality of clock data is transmitted, and said slave unit is constituted so as to receive said plurality of clock data, and specified clock data to be used for starting up the program can be selected from among said plurality of clock data for each axis of a slave unit, thereby allowing to control each axis in synchronism with each other in plurality of groups.

10. The numerical control system according to claim 3, wherein said controlling unit has at least one of operations of resetting and starting of counting, pausing and restarting of counting, and applying override to counting.

11. The numerical control system according to claim 3, wherein said signal from either outside or inside of the system is generated by the master unit and/or one of the slave units.

12. A numerical control method using one numerical control device constituting a master unit, and one or more numerical control devices constituting slave units, and the axes controlled by these different numerical control devices are controlled in synchronism with each other, the numerical control method comprising:

performing by the master unit:
   generating clock data by counting a clock signal from a clock by either counting up or counting down at a prescribed time interval;
   transmitting the clock data to said slave unit from said master unit;
   storing a program including motion commands of an axis controlled by this master unit; and
   starting up said program based on said clock data;
performing by the slave units:
   storing a program including motion commands of an axis controlled by each slave unit; and
   starting up said program based on said clock data from said master unit.

13. The numerical control method according to claim 12, wherein said master unit and said slave unit further perform:
   storing startup time data for starting up said program; and
   starting up said program at a stored startup time.

14. The numerical control method according to claim 12, further comprising controlling a count operation of said clock data generating by a signal from either outside or inside of the system.

15. The numerical control method according to claim 12, wherein said master unit and slave unit further perform adjusting clock data to cope with a delay caused by clock data transmission.

16. The numerical control method according to claim 12, wherein said slave unit further performs adjusting clock data to cope with a delay caused by clock data transmission, and a discrepancy of a reference unit time of an operation.

17. The numerical control method according to claim 12, further comprising starting up a program including motion commands of each axis without relying on said clock data, and which, in a certain section, synchronizes operation of axes of different numerical control devices, and in other different section, operates without synchronization.

18. The numerical control method according to claim 12, further comprising providing said master unit with a plurality of generating units generating a plurality of clock data and transmitting said plurality of clock data, and said slave unit is constituted so as to receive said plurality of clock data, and specified clock data to be used for starting up the program can be selected from among said plurality of clock data for each axis of a slave unit, thereby allowing to control each axis in synchronism with each other in a plurality of groups.

19. The numerical control method according to claim 14, wherein said controlling has at least one of operations of resetting and starting of counting, pausing and restarting of counting, and applying override to counting.

20. The numerical control method according to claim 14, wherein said signal from either outside or inside of the system is generated by a the master unit and/or one of the slave units.

* * * * *